United States Patent [19]

Vogt et al.

[11] 4,108,303
[45] Aug. 22, 1978

[54] POWER TRANSMISSION ASSEMBLY FOR AN ACCUMULATOR CONVEYOR

[75] Inventors: Robert K. Vogt; Martin A. Heit, both of Cincinnati, Ohio

[73] Assignee: The E. W. Buschman Company, Cincinnati, Ohio

[21] Appl. No.: 710,442

[22] Filed: Aug. 2, 1976

[51] Int. Cl.² ............................................. B65G 13/02
[52] U.S. Cl. .................................... 198/781; 198/789
[58] Field of Search ....................... 198/781, 789-791, 198/857, 470; 92/98 R, 98 D, 99, 101, 104

[56] References Cited

U.S. PATENT DOCUMENTS

| | | | |
|---|---|---|---|
| 3,225,893 | 12/1965 | Currie | 198/781 |
| 3,408,899 | 11/1968 | Golden | 92/99 |
| 3,612,248 | 10/1971 | Wallis | 198/781 |
| 3,718,248 | 2/1973 | Muller | 198/781 |
| 3,768,630 | 10/1973 | Inwood et al. | 198/781 |

*Primary Examiner*—Evon C. Blunk
*Assistant Examiner*—Joseph E. Valenza
*Attorney, Agent, or Firm*—James W. Pearce; Roy F. Schaeperklaus

[57] ABSTRACT

An accumulator conveyor of the type that includes a plurality of article accumulating zones extending between the infeed and discharge ends of the conveyor. In preferred form, each of the conveyor's zones includes at least one novel power transmission assembly, all of those assemblies being powered by a single flexible drive member, e.g., an endless chain. Each power transmission assembly includes a novel fluid ram which cooperates with a power wheel to move that power wheel into and out of driving engagement with the conveyor's article propelling member(s) within that zone it serves. Operation of the transmission assemblies is controlled by a fluid control circuit which, in one embodiment, causes all zones to be dead or nondriven when no article is on the conveyor, causes only that zone which supports an article and the zone immediately downstream therefrom to be driven as an article proceeds over the length of the conveyor, causes that zone which supports a second article to go dead when a first article is stopped in the immediately downstream zone, and causes that zone which supports the second article to go live when the first article is removed from the immediately downstream zone, all automatically and in response to the presence or absence of articles on the conveyor.

9 Claims, 21 Drawing Figures

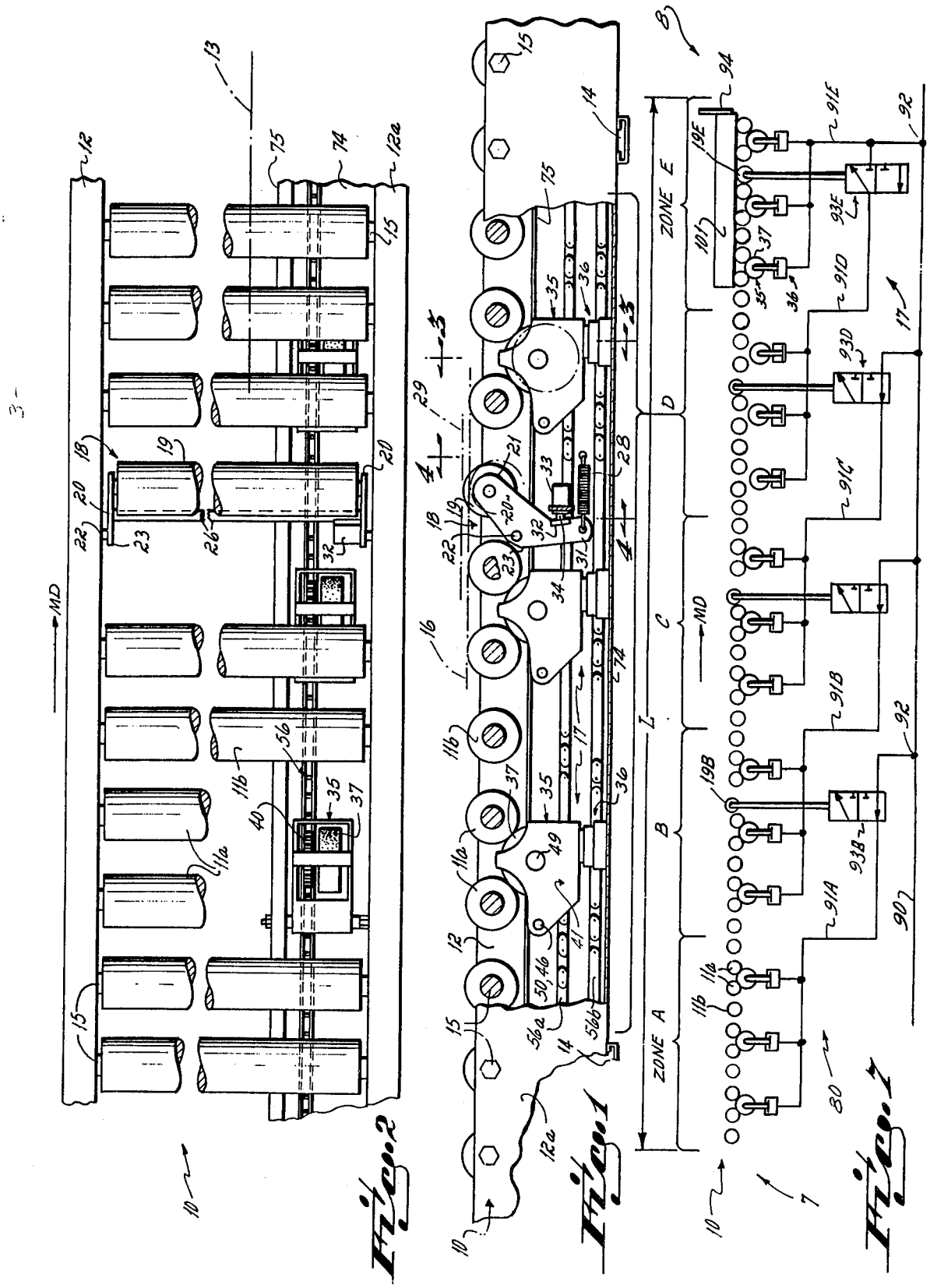

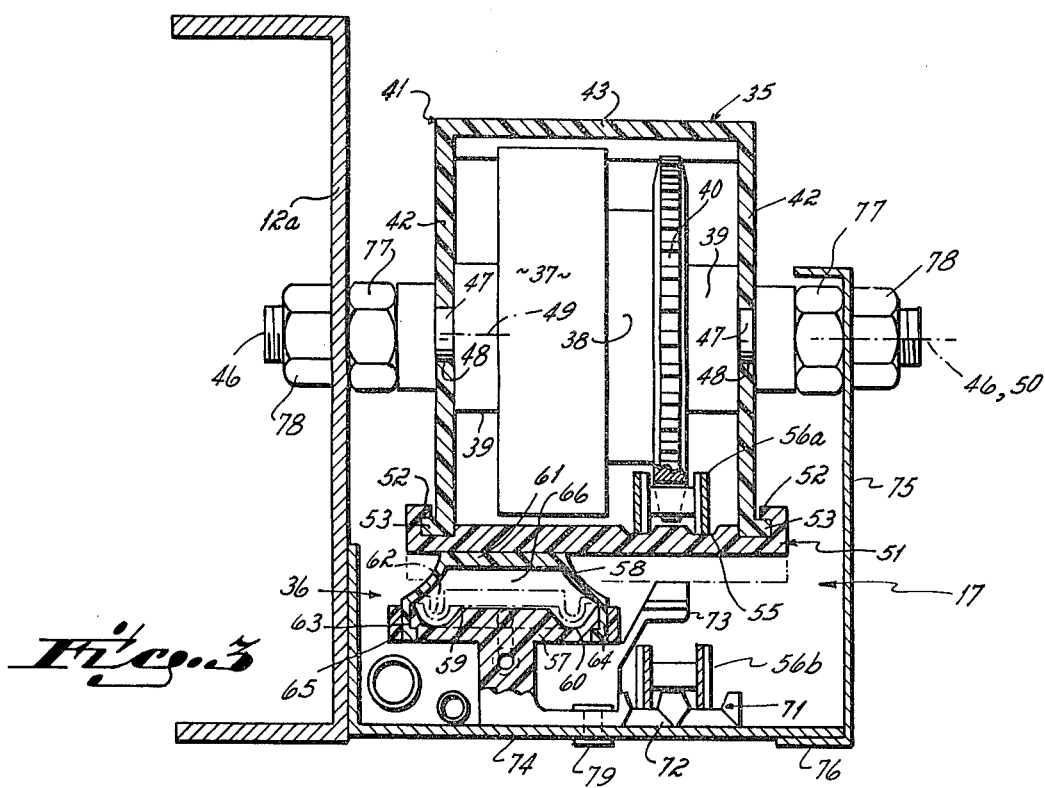
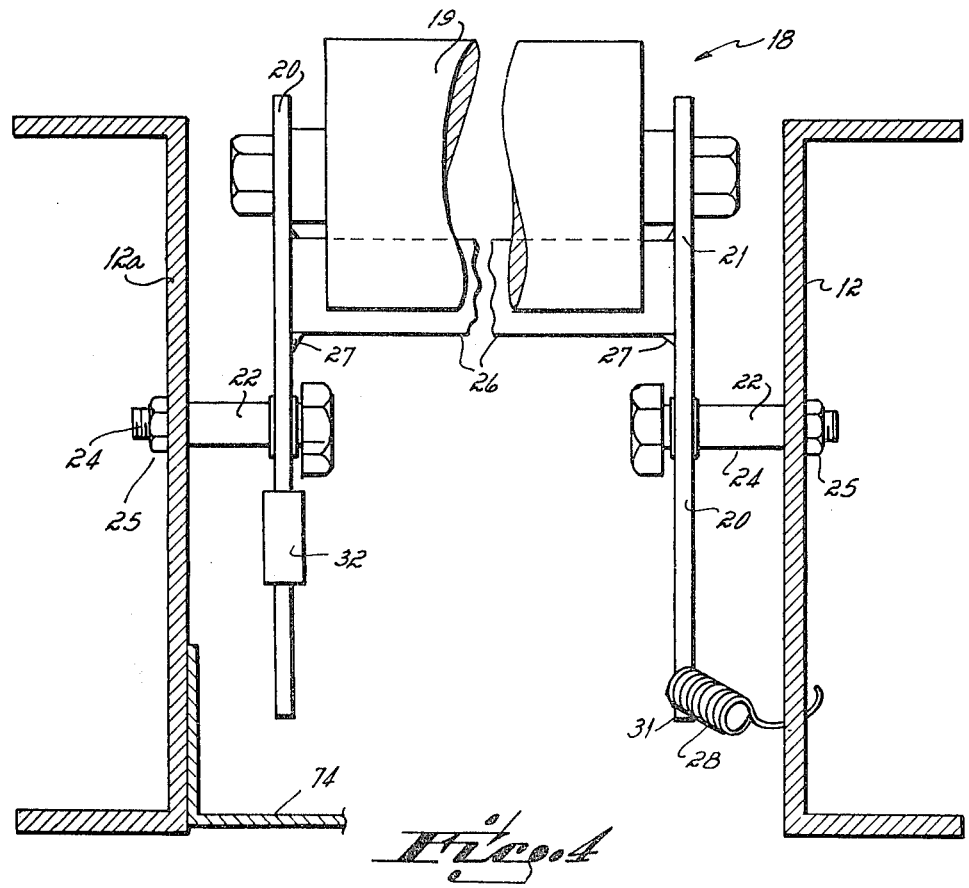

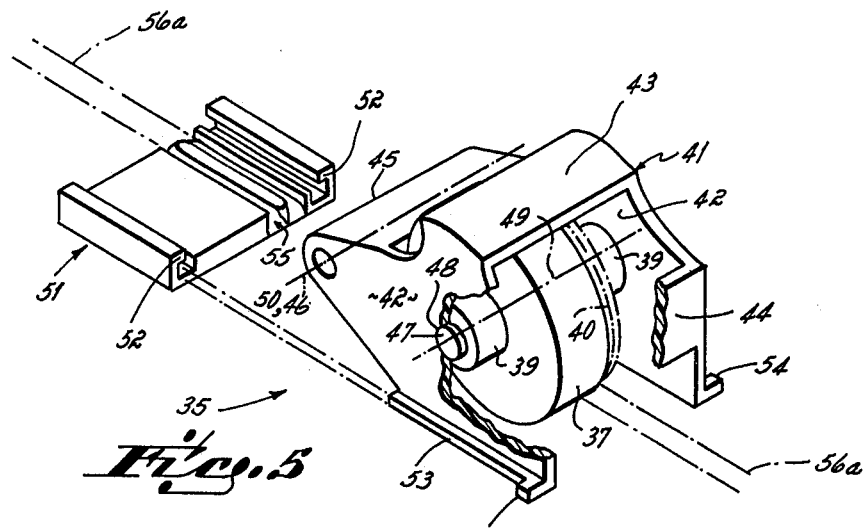
Fig. 5
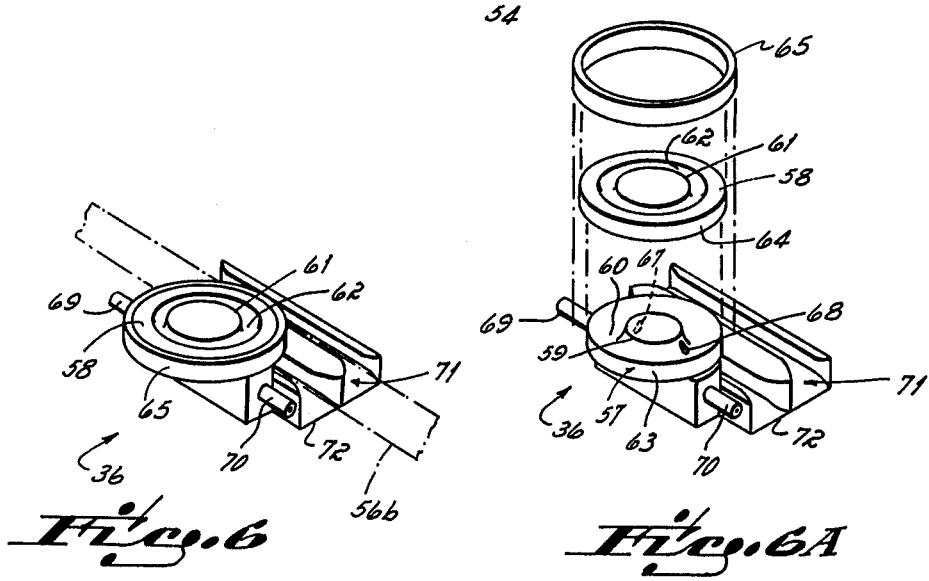
Fig. 6
Fig. 6A

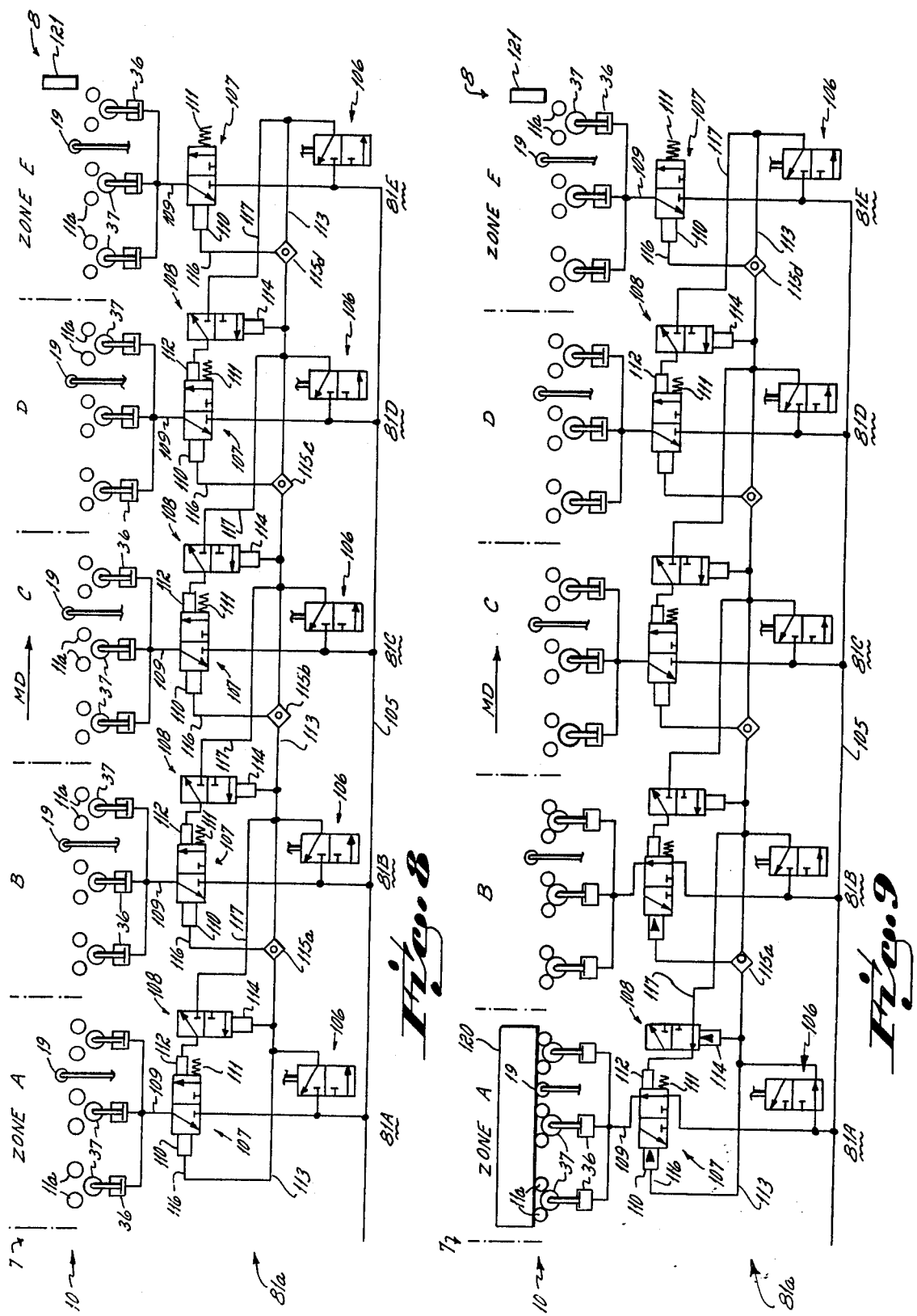

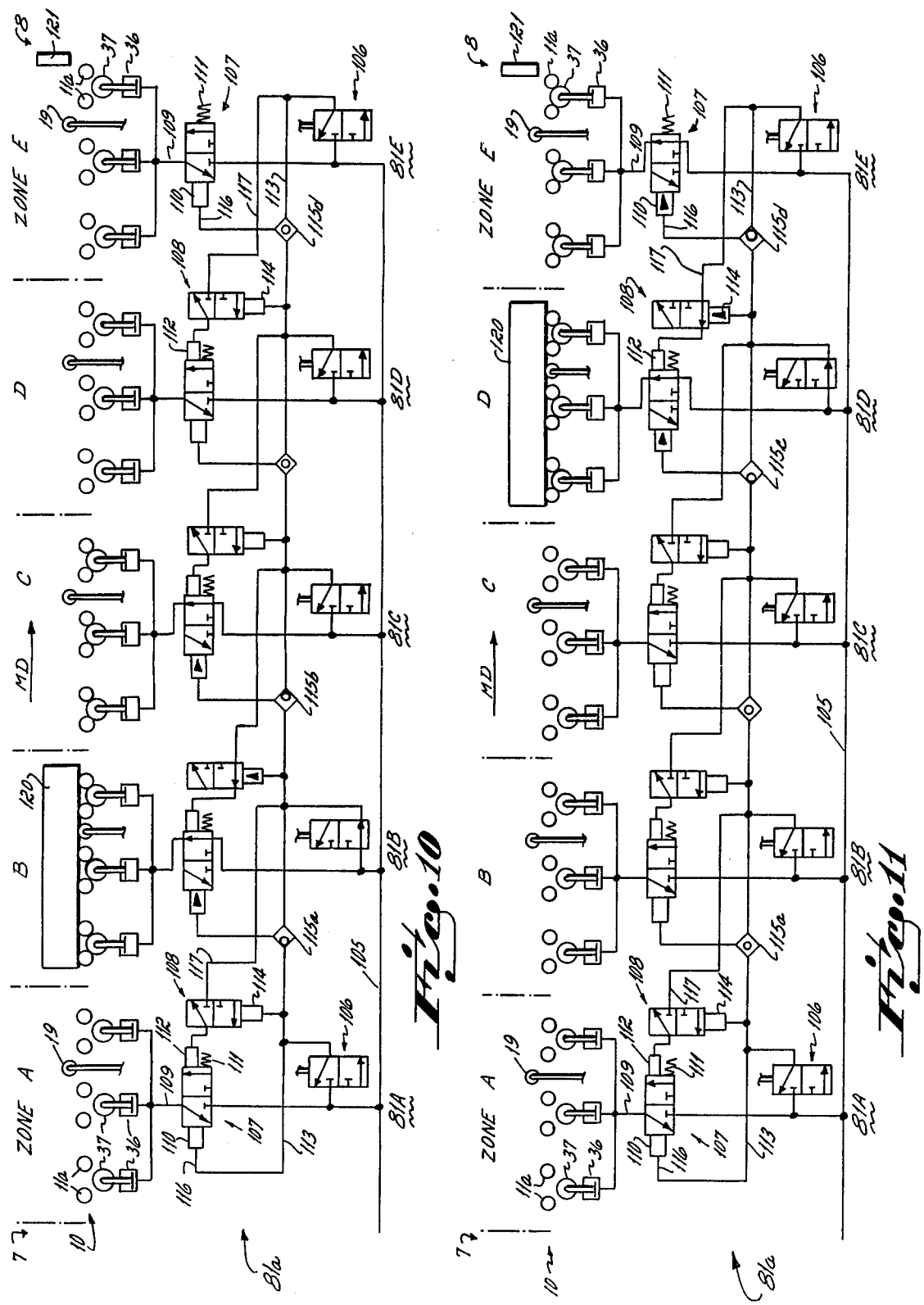

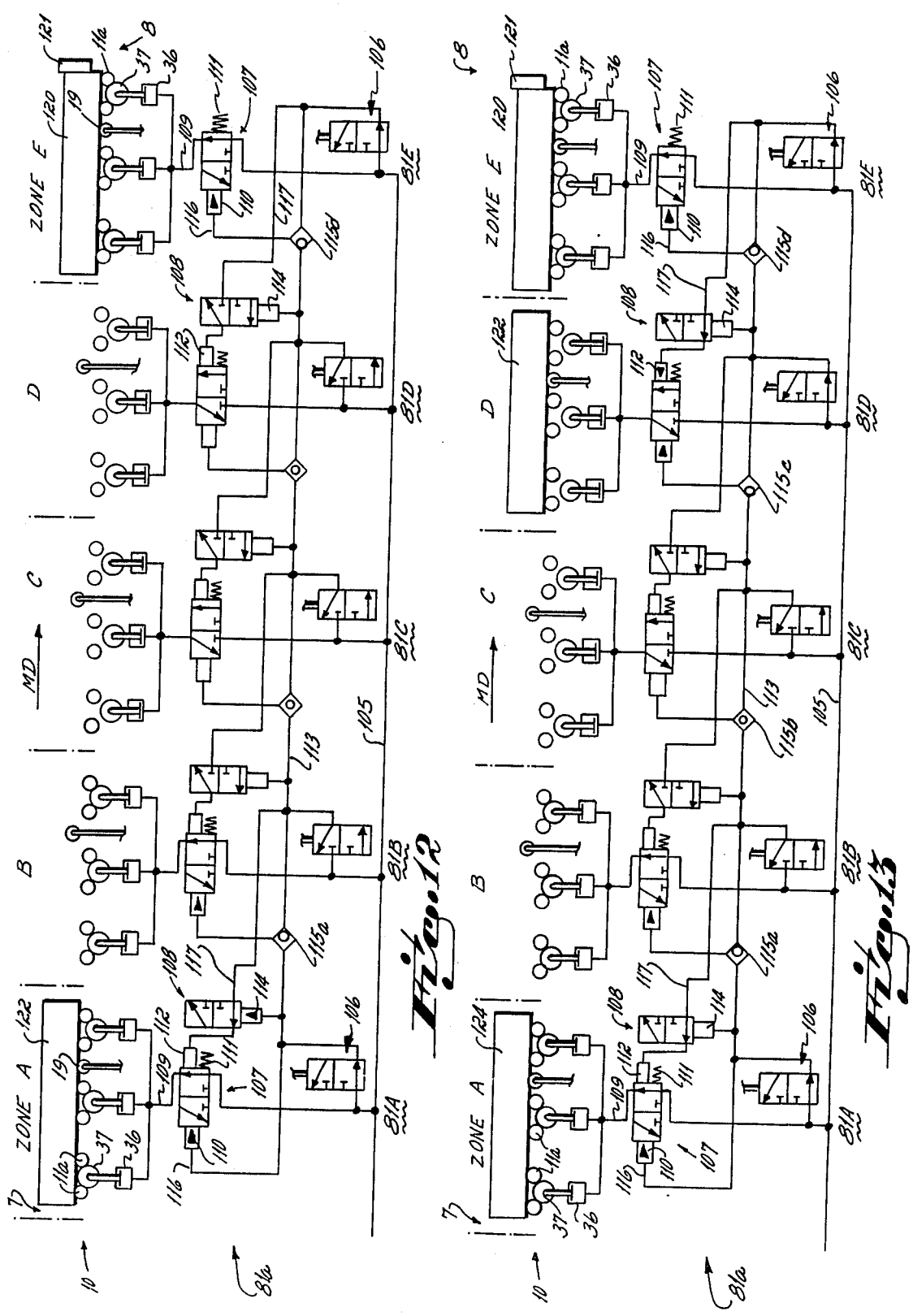

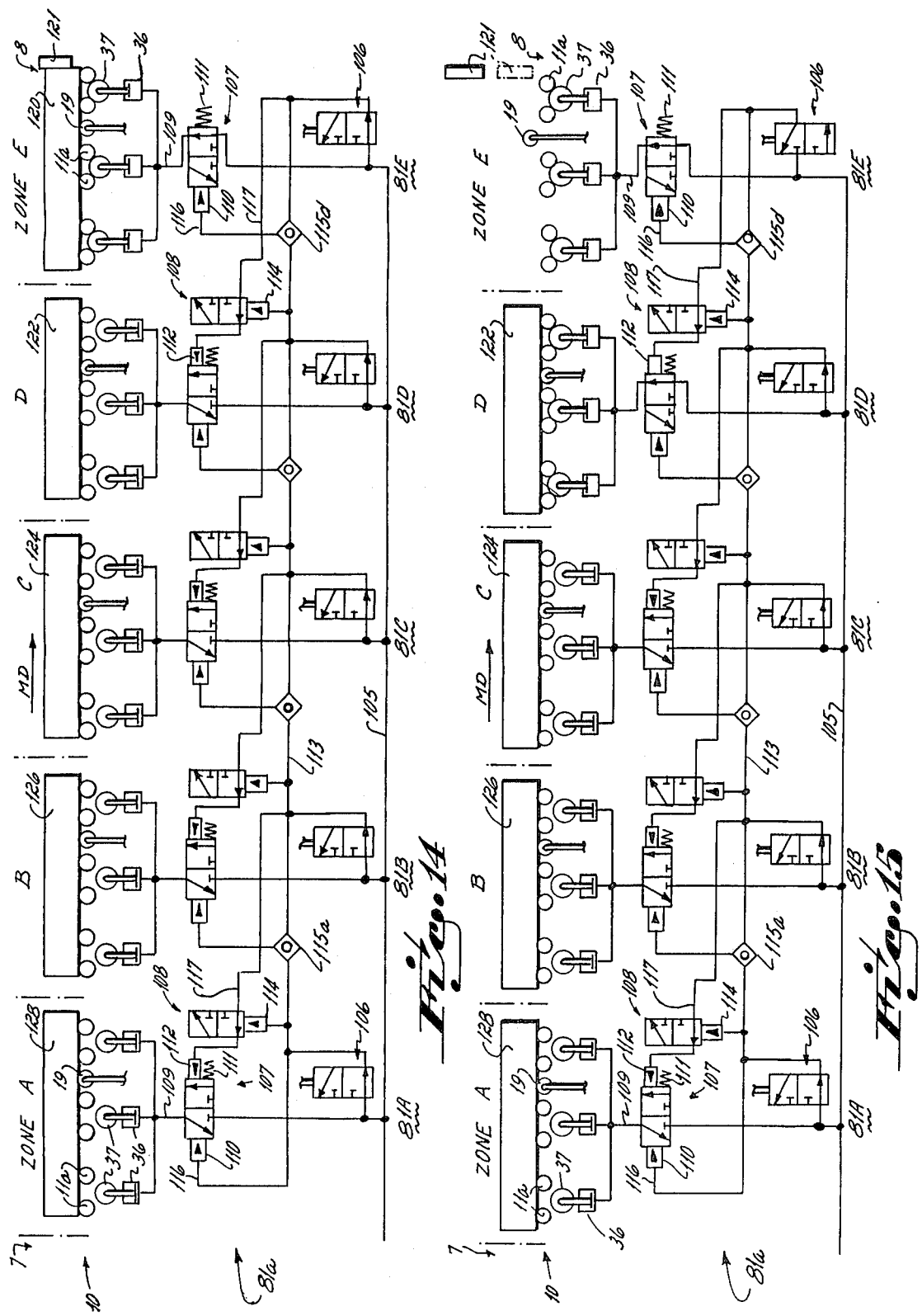

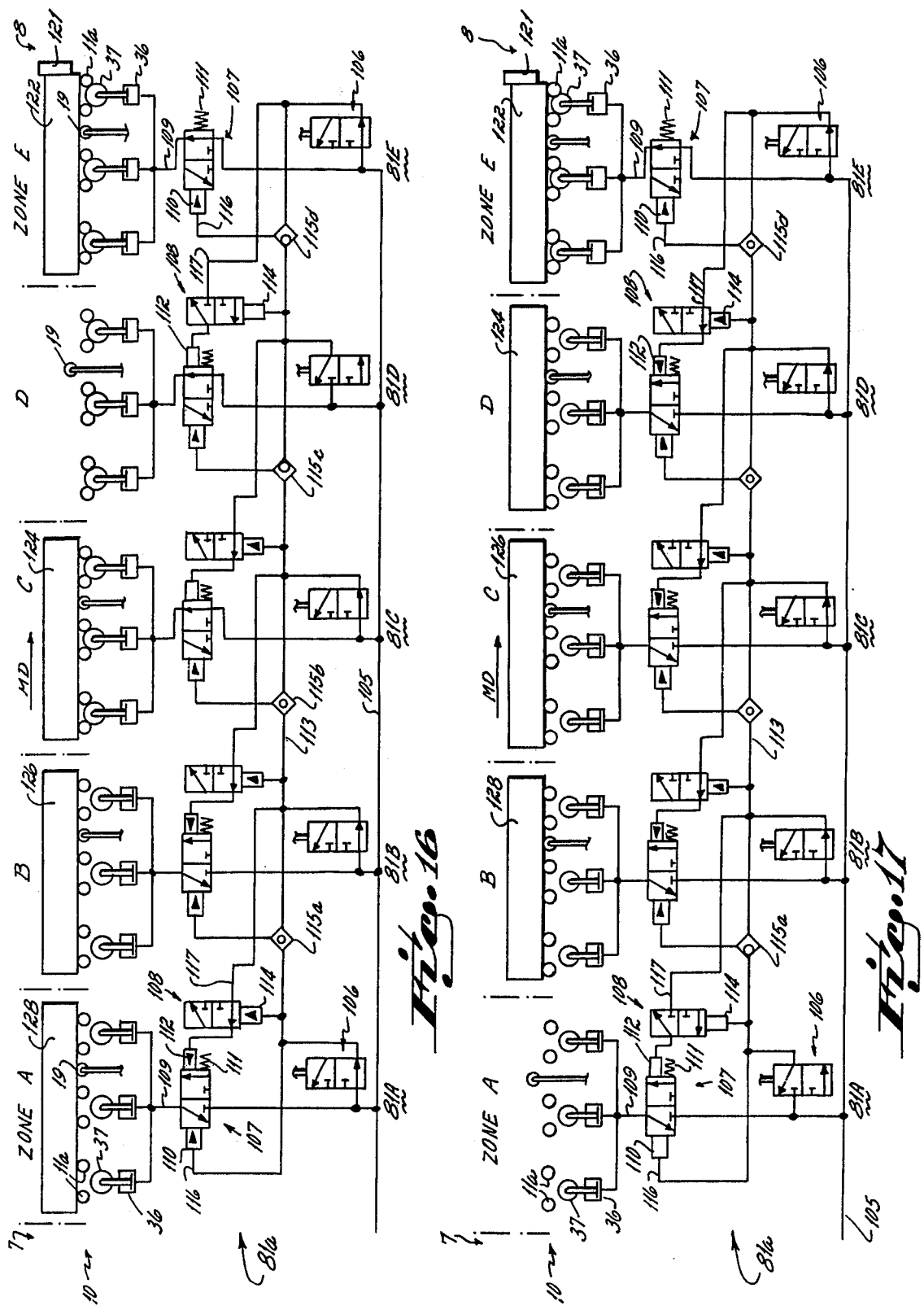

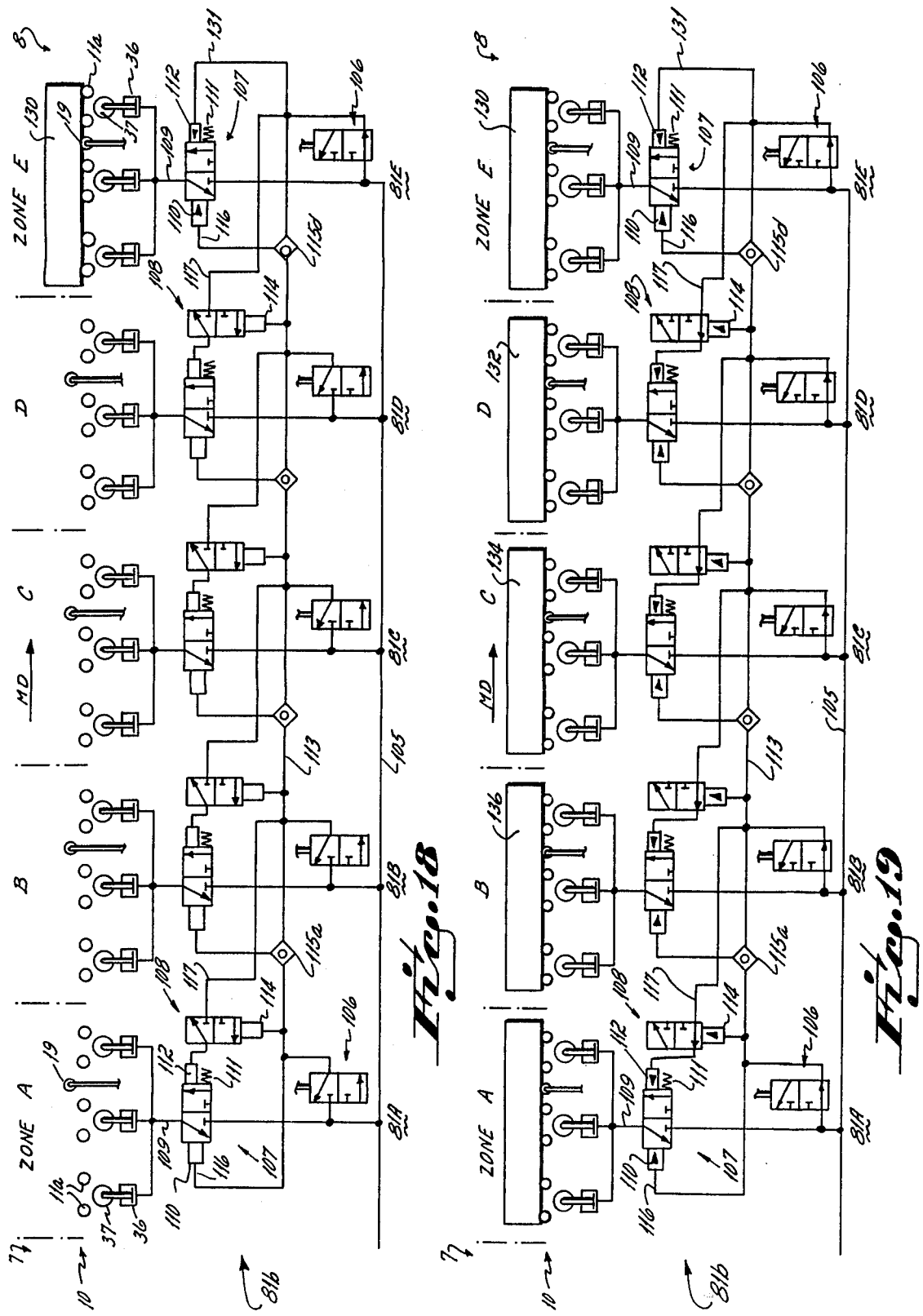

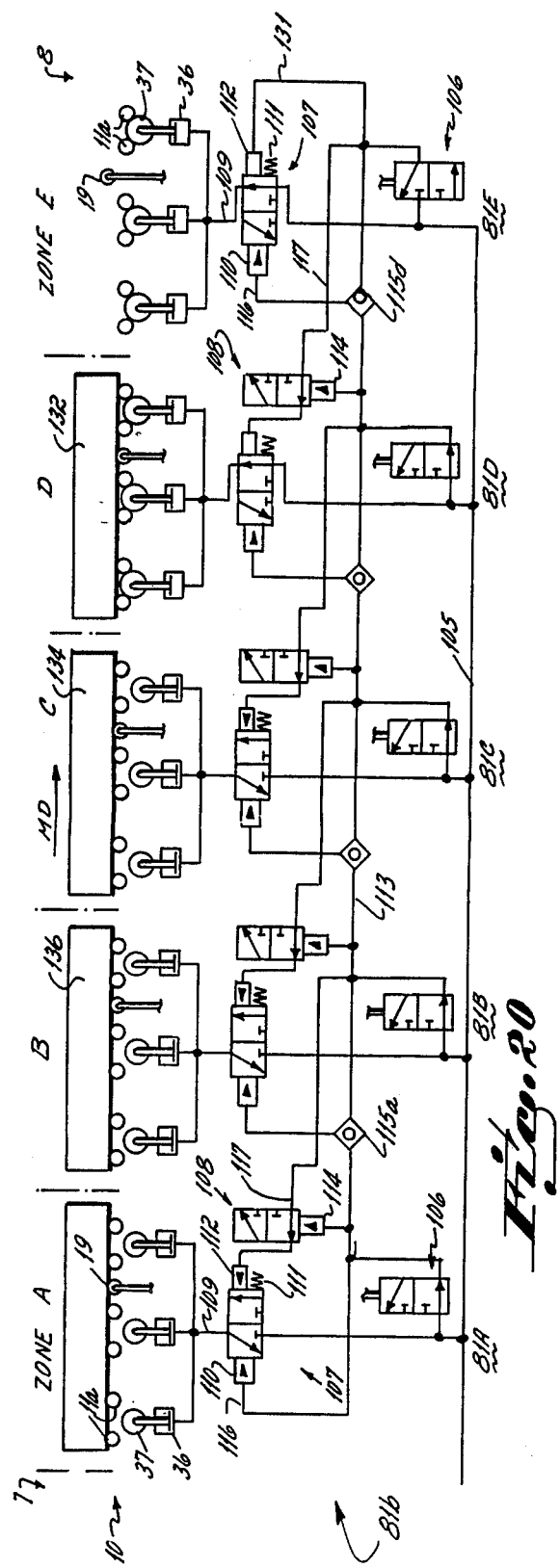

POWER TRANSMISSION ASSEMBLY FOR AN ACCUMULATOR CONVEYOR

This invention relates to conveyors. More particularly, this invention relates to an accumulator conveyor of the type having a plurality of independent zones between the infeed and discharge ends of the conveyor.

Accumulator conveyors are very well known to the prior conveyor art. Basically, an accumulator conveyor is comprised of a plurality of zones along the length of the conveyor from the infeed end to the discharge end thereof. Each of the zones includes a powered propelling member(s) of some type, e.g., roller, wheels, lug-chain belts, or the like, adapted to receive an article from an immediately upstream zone, to drive or propel same across the subject zone, and to deliver same into an immediately downstream zone. A sensor device is associated with each zone which, under normal operating conditions, cooperates with each zone's propelling member(s) to render those propelling members inoperative in a subject zone when an article is stopped in an immediately downstream zone. The sensor for a subject zone is at least partially located within that zone immediately downstream therefrom. Under operational conditions, articles back up from the discharge end toward the infeed end of the accumulator conveyor after a lead article has been stopped in the discharge zone. The conveyor's zones are successively deadened, i.e., the zone's propelling members are successively rendered inoperative, from the discharge end back toward the infeed end as successive articles are stopped in successive zones upstream from the discharge end to the infeed end until the accumulator conveyor is fully loaded and no articles are being transmitted therealong at all. Once the article at the discharge end of the conveyor is removed, the conveyor's zones are then reactivated in sequence from the discharge end toward the infeed end of the accumulator conveyor so as to move the articles along the conveyor once again. In all accumulator conveyor structures currently known to us, all zones of an accumulator conveyor are normally live or operative, i.e., the article propelling member(s) within each zone is normally powered or activated, when no article is on the conveyor so as to provide an immediate propelling force to an article as it passes onto the conveyor at the infeed end. The article propelling member(s) within a subject zone is rendered inoperative, i.e., the zone goes dead, only when a leading article is stopped in an immediately downstream zone, i.e., only when the sensor device (which serves the subject zone but is located at least partially in the downstream zone) is actuated, thereby permitting the trailing article to stop in the subject zone without abutting the leading article in the adjacent downstream zone. As previously mentioned, this basic accumulator conveyor structure, and the function thereof, is well known to the prior art. For purposes of this application, this type accumulator conveyor structure will be referred to as a normally live zone type conveyor, same referring to the fact that all of the conveyor's article propelling members are continuously driven or powered when no articles are present on the conveyor.

Under certain operational conditions, an accumulator conveyor with normally live zones, i.e., with continuously driven article propelling members within each zone, as described above, has a couple of drawbacks. These disadvantages appear, for example, in heavy duty accumulator conveyors adapted to convey heavy articles, e.g., loaded pallets that can only be moved by a fork truck. In the first instance, an accumulator conveyor of, for example, the roller type is generally a relatively noisy device, the noise being generated by continual rotation of the rollers whether articles are or are not being conveyed over the conveyor. Such noise is generally brought about because of the ball bearing structure used for the rollers. For working condition purposes, therefore, it may be desirable to reduce the total noise generated by a normally live zone type accumulator conveyor. In the second instance, a normally live zone type accumulator conveyor may tend to provide a less than totally safe operating environment. This for the reason that the conveyor's article propelling members, e.g., the rollers, wheels, or the like, are continuously powered or driven and are in the conveying plane of the conveyor. The conveying plane is, of course, not concealed from an operator's clothing, or hands, or the like. Although a normally live zone type accumulator conveyor is acceptable from a safety risk standpoint, the operator safety aspects of an accumulator conveyor could be enhanced still further. In the third instance, it is desirable to reduce energy consumption for an accumulator conveyor where possible. With a continuously running or normally live zone type accumulator conveyor, the energy consumption for the continuously driven article propelling members, e.g., rollers or belts or lug-chains or the like, in the conveyor's conveying plane is substantial. Under those operational conditions when no articles are provided to traverse the conveyor's length, therefore, it would be desirable to reduce the energy consumption of an accumulator conveyor as far as possible. Lastly, it is desirable to provide an accumulator conveyor with as long a useful life as is economically feasible. In this regard, in the case of a normally live zone type accumulator conveyor, and particularly when articles are not passing thereover, maintaining the conveyor's article propelling members in a continuously running or live state only promotes wear and tear on the conveyor parts, thereby reducing the useful life of the accumulator conveyor itself.

Accordingly, it has been the primary objective of this invention to provide a novel power transmission assembly for an accumulator type conveyor, whether that conveyor is of the normally live zone type or of the normally dead zone type, which is economical to manufacture, which is substantially maintenance free, and which is easy to service if maintenance is required.

In accord with the primary objective of this invention, each novel transmission assembly is operative in response to fluid signals from a fluid circuit which controls the flow of articles along the conveyor. The transmission assembly structure is operable with either a continuously driven or live accumulator conveyor, or a normally nondriven or dead accumulator conveyor. In preferred form, each transmission assembly includes at least one power transfer device within each of the conveyor's zones, each such device comprising a power wheel movable between a driving position whereat same frictionally and drivingly contacts the article propelling members (located in the conveying plane of the conveyor), and a nondriving position where same is out of driving contact therewith. The power wheel is carried in a bracket which, in preferred form, is pivotally mounted to the conveyor's frame so as to pivot between the driving and nondriving positions, the bracket also carrying a power sprocket therein. A single endless flexible drive member, e.g., a link chain, interconnects all drive sprockets in all zones, the power wheels being independently movable between driving and nondriving positions along the length of that single chain. A separate fluid ram type actuator in the form of a deformable diaphragm is positioned beneath the bracket of each power transfer device, same being connected with a fluid control circuit. The diaphragm activates to a drive position to move the power wheel into driving engagement with the article propelling member(s) of a zone when a fluid signal is received from that zone's fluid control sub-circuit. The deformable diaphragm returns to a home or nonactivated position, due to resilient or memory characteristics thereof, when the fluid signal is exhausted from that zone's sub-circuit. When the positive fluid signal is exhausted, the power wheel pivots to the nondriving position due to gravity acting thereon, as well as due to interaction of the flexible drive member on the mounting bracket therefor.

Further objectives and advantages of this invention will be more apparent from the following detailed description taken in conjunction with the drawings in which:

FIG. 1 is a partially broken away side view of a portion of an accumulator conveyor illustrating a transmission assembly in accord with the principles of this invention;

FIG. 2 is a top view of the accumulator conveyor illustrated in FIG. 1;

FIG. 3 is a cross-sectional view taken along line 3—3 of FIG. 1;

FIG. 4 is a cross-sectional view taken along line 4—4 of FIG. 1;

FIG. 5 is a perspective view illustrating a novel power transfer device, which is a part of the transmission assembly, in accord with the principles of this invention;

FIG. 6 is a perspective view of a novel fluid ram, which is a part of the transmission assembly, in accord with the principles of this invention;

FIG. 6A is an exploded view of the fluid ram shown in FIG. 6;

FIG. 7 is a fluid circuit diagram illustrating use of the novel transmission assembly in a continuously running or live zone type conveyor structure;

FIG. 8 is a fluid control circuit illustrating use of the novel transmission assembly in a normally nondriven or dead zone type conveyor, that circuit functioning to control the article propelling rollers within certain of the conveyor's zones so that same rotate only in response to an article in a subject zone or in a zone immediately upstream thereof, and with the article propelling rollers in the discharge zone being continuously driven when an article is stopped therein;

FIG. 9 is a view similar to FIG. 8 showing entry of a first article into the conveyor's infeed zone, and the effect of the article in that zone on the fluid sub-circuit for the infeed zone as well as on the first intermediate zone downstream therefrom;

FIG. 10 is a view similar to FIG. 8 showing the first article in the first intermediate zone, and the effect of the article in that zone on the fluid sub-circuit for the first intermediate zone as well as on the infeed zone upstream thereof and on the second intermediate zone downstream therefrom;

FIG. 11 is a view similar to FIG. 10 showing the first article in the third intermediate zone, and the effect of the article in that zone on the fluid sub-circuits for the third intermediate zone as well as on the discharge zone downstream thereof and on the second intermediate zone upstream therefrom;

FIG. 12 is a view similar to FIG. 11 but showing the first article stopped in the discharge zone (that first article being so stopped by a mechanical stop), and the effect of the article in that zone on the fluid sub-circuits for the discharge zone as well as on the third intermediate zone upstream therefrom, and showing the entry of a second article into the infeed zone;

FIG. 13 is a view similar to FIG. 12 showing accumulation of articles in the discharge zone and the third intermediate upstream zone thereof, and entry of a third article into the infeed zone;

FIG. 14 is a view similar to FIG. 13 showing articles accumulated in each and all of the zones of the accumulator conveyor;

FIG. 15 is a view similar to FIG. 14 showing the first article in the discharge zone having been removed, e.g., due to release of the mechanical stop, and the effect of removal of that first article on the fluid sub-circuit for the discharge zone as well as on the third intermediate zone upstream therefrom;

FIG. 16 is a view similar to FIG. 15 showing the second article in the third intermediate zone having moved to the discharge zone where same is stopped, and the effect of that movement on the fluid sub-circuit for the third intermediate zone as well as on the second or middle intermediate zone;

FIG. 17 is a view similar to FIG. 16 showing the articles again accumulated in successive downstream zones of the accumulator conveyor, and the effect of that accumulator on the fluid sub-circuit for all intermediate and discharge zones, as well as on the infeed zone where no article is stopped;

FIG. 18 is a view similar to FIG. 8, but with the article propelling rollers in the discharge zone being continuously dead or nondriven when an article is stopped therein, and showing the effect of an article in the discharge zone on the fluid sub-circuit for that zone and the effect of an article in the first intermediate zone on the fluid sub-circuit for that zone as well as for the infeed and second intermediate zones;

FIG. 19 is a view similar to FIG. 18 but with articles accumulated in each and all of the zones of the conveyor; and FIG. 20 is a view similar to FIG. 18 showing the first article in the discharge zone having been removed, e.g., by manually lifting same off of the zone, and the effect of removal of that first article on the fluid sub-circuit for the discharge zone as well as on the third intermediate zone upstream therefrom.

CONVEYOR STRUCTURE

The accumulator conveyor 10 structure illustrated in this application is a roller 11 type conveyor, see FIGS. 1 and 2. The structure basically includes a pair of opposed channel-shaped side walls 12 disposed parallel one to the other and running the length of the conveyor, the side walls defining the longitudinal axis 13 of the conveyor. The channel-shaped side walls 12, which channels open outwardly, are held in rigid structural relation with one another by a plurality of cross-structural members 14. The cross-structural members 14 are disposed in spaced relation along the length of the conveyor on the underside of the conveyor, and are fixed to the side channel members in any suitable manner, such as by welding, so as to provide a rigid framework 12, 14 for the conveyor structure.

A plurality of rollers 11 are disposed laterally relative to the longitudinal axis 13, i.e., the conveying path, of the conveyor structure. The rollers 11 include spring loaded hexagonal axles 15 received in hexagonal holes defined in the side walls 12 of the conveyor structure, the rollers incorporating antifriction bearings (not shown) which permit same to rotate freely relative to the axles and, therefore, relative to the conveyor framework 12, 14. The rollers 11 thereby define a conveying plane 16 that is fixed or immobile relative to the conveyor's framework 12, 14 although, of course, the rollers rotate individually and freely, i.e., separately one from the other, within that framework. Some of the rollers 11a are adapted to be driven as described in detail below; these rollers 11a also function as a support means for articles conveyed along the conveyor's length. Thus, rollers 11a function as article propelling members when same are positively driven or rotated, same driving articles along the conveyor's length from infeed end 7 to discharge end 8 in machine direction MD by frictional engagement with the underside of the article. Others of the rollers 11b are simply idler rollers to provide added support for the articles as same are conveyed or propelled along the conveyor's length by propelling rollers 11a, thereby functioning as rotating idler members.

The accumulator conveyor 10, throughout its length L, is divided into a plurality of zones A-E from inlet end 7 to discharge end 8 of the conveyor relative to the machine direction MD of the conveyor. Each zone A-E, for purposes of illustration in connection with this application, is shown as including three pairs of propelling rollers 11a, each pair of drive rollers or propelling rollers being serviced by a single fluid controlled transmission assembly 17 of novel structure, and three idler rollers 11b, all as illustrated in FIG. 1 where a single zone D is illustrated. Further, a single article sensor device in the form of a sensor roller assembly 18 is provided in each zone B-E (in the case of a FIG. 7 fluid circuit) or A-E (in the case of a FIG. 8 or 18 fluid circuit), that assembly including a transversely disposed sensor roller 19 of the same freely rotating structure as rollers 11a and 11b, see FIGS. 1, 2 and 4.

The sensing roller assembly 18 within any zone A-E includes sensor roller 19 rotationally mounted in idler roller fashion between opposed bellcrank arms 20, see FIGS. 1, 2 and 4. The sensor roller 19 is mounted in symmetrical fashion at hand end 21 of the bellcrank arms 20, and the bellcrank arms are pivotally mounted to, but spaced from, opposed side walls 12 of the conveyor's framework 12, 14 on pivot axis 22 at the elbows 23 of the bellcrank arms. The pivot axis 22 connection is established by axle bolts 24, and nuts 25, see FIG. 4. The bellcrank arms 20 are held in rigid relation one to the other, i.e., the bellcrank arms pivot as a pair about axis 22 and not independent of one another, by virtue of structural connecting bar 26 that is welded, as at 27, to each arm 20. The sensor rollers 19, i.e., the bellcrank arms 20, are all spring 28 loaded as to urge the sensor rollers into a sensing plane 29 with no articles on the conveyor, that sensing plane being elevated above the conveying plane 16 defined by the propelling 11a and idler 11b rollers of the conveyor 10 structure. Each spring 28 is connected in tension between the conveyor framework's side wall 12 and the lower end 31 of the bellcrank arm 20. Further, one arm 20 of each sensor roller assembly 18 includes a wear strip 32 adapted to cooperate with a sensor valve 33 fixed in place to the adjacent side wall 12 of the conveyor framework 12, 14. The sensor valve 33 is part of a fluid control circuit, described in detail below, provided for the purpose of controlling the operation of the conveyor 10 structure in accord with an operational method also described in detail below. Thus, the up or sensing position of the sensing rollers 19, which position is in effect a home position and defines sensing plane 29 when no article is present, is established by arm 20 abutting against sensor valve 33 as continuously urged by the bias of spring 28, see solid line position shown in FIG. 1. The activated position of the sensor roller 19 is established when the sensor roller is depressed into the conveying plane 16 of the conveyor 10 as an article passes thereover, the sensor roller being adapted to pivot down about axis 22 in response to the articles' weight and against the bias of spring 28, thereby releasing engagement of arm 20 with sensor valve 33, see phantom line position shown in FIG. 1. Thus, sensor device 18, through sensor roller 19 and arm 20, serves to provide sensor valve 33 with a mechanical signal as to whether an article is present or absent from a subject zone, thereby activating or deactivating the three transmission assemblies 17 within the zone with which same is operatively connected and as controlled by the fluid control circuit and all as described in detail below.

The transmission assemblies 17 within each zone A-E of the conveyor 10 structure are identical one to the other. Each transmission assembly 17 functions to provide or eliminate a driving or rotational force to its propelling rollers 11a in response to logic instructions from a fluid control circuit, described below. Each transmission assembly 17 is structured to drive two adjacent propelling rollers 11a, thereby providing six propelling rollers in a typical conveyor zone A-E as illustrated in FIG. 1. Each transmission assembly 17 includes a power transfer device 35 and a fluid ram 36. The power transfer device 35 transmits power from a power source to the propelling rollers 11a in response to operation of the fluid ram 36.

The power transfer device 35 includes a power or friction drive wheel 37 fabricated of a high friction material such as urethane, see FIGS. 3 and 5. The power wheel 37 is press-fit on a hub 38 fixed to an axle sleeve 39; the hub 38 and axle sleeve 39 may be molded integral one with the other through use of a high strength plastic. Drive sprocket 40 is coaxially and fixedly disposed relative to the power wheel 37 on hub 38, and may also be molded integral with the hub and axle sleeve 39. The hub 38, axle sleeve 39 and sprocket 40 as shown is fabricated as a single or one-piece unit. The power wheel 37 and drive sprocket 40 are rotationally mounted in a housing 41 having opposed side walls 42, a top web member 43, a front web member 44, and a rear web member 45, the web members structurally restraining the side walls in fixed relation one with the other. The drive wheel 37 and drive sprocket 40 are rotationally carried on an axle 47, the axle being restrained in holes 48 in side walls 42, thereby rotationally mounting the drive wheel on axis 49 in a freely rotating relation with the housing. The housing's rear web member 45 is in the form of a sleeve adapted to receive a pivot pin 46, the pivot pin being fixed to the conveyor's framework 12a as described in detail below, thereby pivotally mounting the drive wheel 37 on pivot axis 50 in a pivotal relation with the article propelling members 11a in the conveying plane 16.

Note particularly, as illustrated in FIG. 5, that the housing 41 for the drive wheel 37/drive sprocket 40 assembly is closed at the bottom side by removable door 51, but is accessible from the bottom side thereof by virtue of that door. The removable door 51 includes upstanding, inwardly turned lips 52 at each side thereof adapted to be received over protruding lips 53 along opposed bottom edges of the housing 41, stops 54 being provided at each leading end of the housing's lips to positively locate the door in operational position with the housing. The door 51, i.e., the floor of the housing 41, defines a formed path 55 for the power run 56a of an endless drive chain 56, which path is spatially located relative to the drive sprocket so as to retain the drive chain's power run in driving engagement with that sprocket during use of the conveyor 10 structure, all as illustrated in FIG. 3. In other words, the removable housing door 51 cooperates with the power sprocket 40 to restrain the drive chains's power run 56a in driving engagement with the power sprocket during use of the conveyor 10, as well as to permit easy removal of the drive chain's power run from the power sprocket for maintenance purposes simply by sliding the door out from structural engagement with the housing during maintenance work on the conveyor.

The fluid ram 36 is particularly illustrated in FIGS. 3, 6 and 6A. The fluid ram 36 functions as the actuator for the power transfer device 35, as is described in detail below. As shown in those Figures, the fluid ram 36 includes a rigid seat member 57 that supports or mounts a flexible or deformable diaphragm member 58. The seat 57 is generally hat-shaped in cross-sectional configuration, and includes a crown portion 59 surrounded by an annular groove 60. The flexible diaphragm 58 has generally analogous crown 61 and annular spring 62 portions, and is snap fitted into interengagement around the periphery 63 of the fluid ram's seat 57, the depending side walls 64 of the flexible diaphragm being held in fixed relation with the periphery of the seat by a snap ring 65. The flexible diaphragm 58 is fabricated so that the crown 61 portion is thicker than the annular spring 62 portion since the diaphragm's crown 61 contacts the power transfer device 35 during use as described in detail below. The flexible diaphragm 58 is fabricated of a material (e.g., polyurethane) that exhibits an inherent resilience or memory, the diaphragm being structured so that in the home or rest, i.e., nonactuated, position same is as illustrated in phantom lines in FIG. 3. In other words, the inherent memory of annular spring 62 of the deformable diaphragm 58 is such that same tends to return to the rest attitude shown in phantom lines in FIG. 3 unless deformed out of that attitude by fluid pressure as described in detail below. Thus, a fluid tight chamber 66 is defined between the diaphragm 58 and the seat 57, this fluid tight chamber being interconnected with a fluid control circuit described in detail below. The fluid tight chamber 66 is served by ports 67, 68 disposed within the seat's crown 59, those ports being vertically communicative with horizontal service coupling adaptors 69, 70, respectively, adapted to interconnect with the conveyor's fluid control circuit. Thus, the fluid circuit through each fluid ram 36 includes service port 67, fluid tight chamber 66 and service ports 68.

The fluid ram's seat 57 structure is molded (from, e.g., a plastic) integral with a formed path 71 structure that defines the return run 56b path of the drive chain 56. The formed path 71 structure simply includes a support base 72 and an overhang 73, same cooperating to aid in restraining the return run 56b of the drive chain in operative position with the associated power transfer device 35.

The transmission assemblies 17 are connected to the conveyor framework 12, 14 along one side wall 12a of the framework only, see FIGS. 2 and 3. The support structure for the transmission assemblies 17 includes an angle floor member 74 running the length of the conveyor 10 structure along that one side wall 12a thereof, same being positively connected to the side wall by bolts and nuts (not shown). An upstanding channel cover 75 is fixed as by welding at lower flange 76 to the floor member 74. Thus, the upstanding channel member 75 and the floor member 74, along with the side wall 12a of the conveyor framework 12, 14 provides the mounting means for the transmission assemblies 17.

Each power transfer device 35 is pivotally mounted between the conveyor framework's side wall 12a and the channel cover 75 on pivot pin 46. The pivot pin 46 is fixed between the walls 12a, 75 by spacer nuts 77 and lock nuts 78 at each end thereof. Thus, the power transfer device 35 is adapted to move between driving and nondriving positions relative to article propelling rollers 11a (compare the full line position in FIGS. 1 and 3 with the phantom line positions in FIGS. 1 and 3), i.e., to pivot about its mounting axis 50 with the conveyor framework 12a, 75, in response to the fluid ram 36. Note each power transfer device 35 is pivotally connected to the conveyor framework 12a, 75 with the pivot axis 50 located upstream of the power wheel 37 relative to the machine direction MD of articles as same travel along the conveyor's length.

A fluid ram 36 is fixed in place beneath each power transfer device 35 as illustrated in FIGS. 1 and 3. The fluid ram and the chain 56 guide structure 71, which is one molded piece in preferred structural embodiment, is fixed in location to the floor 74 member by rivets 79. This unit is positioned so that the flexible diaphragm 58, upon being exposed to fluid pressure in response to the fluid control circuit described in detail below, can drivingly engage the power transfer device's power wheel 37 with the article propelling rollers 11a. The unit is also positioned so that in the nondriving position, the housing's door 51 rests on the overhead support 73 for the return run 56b of the drive chain 56, thereby preventing contact of the housing 41 with the flexible diaphragm 58 except when the diaphragm is activated to uphold same in the driving attitude.

As previously made reference to, a single drive chain 56 having an upper power run 56a and a lower return run 56b is drivingly connected with all power transfer devices 35. The endless drive chain 56, i.e., endless flexible drive member, directly connects with all the power transfer devices 35 in all zones A-E to continuously drive all power wheels 37 whether same are engaged or disengaged with the article propelling rollers 11a. Of course, this structure indirectly connects the flexible drive member or drive chain 56 with the article propelling rollers 11a, that indirect connection being selectively made through the power transfer device 35 as controlled by the fluid control circuit described in detail below. The drive chain 56 is located substantially below the conveying plane 16 of the conveyor 10 structure, and is confined within the conveyor's subframework defined by side wall 12a, floor member 74 and channel member 75. As previously mentioned, the drive chain 56 is maintained in operational engagement with the drive sprockets 40 of all power transfer devices 35 by virtue of the housing 41/door 51 structure throughout its length. The endless drive chain 56 is carried at one end on an idler sprocket (not shown), and at the other end on a drive sprocket (not shown), the drive sprocket being continuously powered by a suitable electric motor (not shown).

FLUID CONTROL CIRCUITS

As previously mentioned, the novel transmission assembly 17 structure of this invention may be adapted for use with an accumulator conveyor where the article propelling rollers 11a are live or continuously running, i.e., continuously rotating, those rollers within a given zone A-E only being stopped when articles have backed up or accumulated on the conveyor from the discharge end 8 to that given zone. This functional or operational method for an accumulator conveyor 10 is well known to the prior art, and the transmission assembly 17 of this invention is adapted for use with a fluid control circuit 80 that performs that function as illustrated in FIG. 7.

Also as mentioned, and in accord with the principles of this invention, the transmission assembly 17 structure of this invention is also adapted for use with an accumulator conveyor where the article propelling rollers 11a are dead or normally stopped, i.e., normally not rotating within a given zone A-E. The accumulator conveyor's propelling rollers 11a in a subject zone, and in that zone immediately downstream therefrom, are activated, i.e., are caused to rotate by the novel transmission assembly 17 only when an article is present in a subject zone and as long as no article is stopped in that immediately downstream zone. The fluid control circuit 81 that illustrates this method of operation is illustrated in FIGS. 8-20. Within this operational method, the article propelling rollers 11a within the discharge zone E of the accumulator conveyor, in accord with alternative embodiments 81a, 81b of the fluid control circuit 81, may be adapted to continuously run when an article is stopped therein (i.e., may remain live even after an article is stopped (therein), or may be adapted to go dead when an article is stopped thereon (i.e., may stop rotating when an article is stopped therein). With regard to the former operational condition, same is illustrated in FIGS. 8-17, and with regard to the latter operational condition, same is illustrated in FIGS. 18-20.

The fluid piping for the fluid control circuits 81, described in detail below, is carried within the conveyor's sub-framework as defined by side wall 12a, floor 74 and channel 75 and as illustrated in FIG. 3. In connection with the fluid control circuits 80, 81a, 81b described, same may be either pneumatic or hydraulic circuits. However, for purposes of this application, same will be described as pneumatic circuits.

For purposes of description of the pneumatic control circuits disclosed in this application, it will be understood that reference to a closed valve means that the valve is ported so as to exhaust downstream air to atmosphere and to stop supply air, and an open valve means that the valve is ported so as to permit supply air to pass downstream through the valve.

CONTROL CIRCUIT FOR NORMALLY LIVE ACCUMULATOR CONVEYOR

With regard to the fluid control circuit 80 for a normally live accumulator conveyor 10 using the improved transmission assembly 17 of this invention, same is illustrated in FIG. 7. As shown in that Figure, the circuit 80 includes a supply air line 90 connected to a pressurized air supply (not shown). Each zone A-E of the conveyor along its length is provided with a transmission air line 91, that air line 91 being tapped into the main air supply line at point 92 and being connected in series with all fluid rams 36 for all transmission assemblies 17 serving a subject zone (three such assemblies 17 being shown for each zone as illustrated in FIG. 7). Interposed in transmission air line 91 between the pneumatic rams 36 and the main air supply line 90, for the sub-circuits in all zones A-D except the discharge zone E, is a three-way sensor valve 93 of the normally closed type.

Each normally closed three-way sensor valve 93 is mechanically operated by sensor roller assembly 18. More particularly, the three-way sensor valve 93 is analogous to the valve 33 shown in FIG. 1, and has a spring loaded plunger adapted to cooperate with the bellcrank arm 20 of the sensing roller assembly 18. A typical valve 93 useful in the circuit is Model No. MAV-3, marketed by Clippard Instrument Laboratory, Inc., Cincinnati OH 45239. Although each three-way valve 93 is a normally closed valve, same is held open during that part of the accumulator conveyor's operation when there is no article within the zone A-D it serves, i.e., when no article is depressing its associated sensing roller 19 from its sensing plane 29 into the conveying plane 16, due to the spring 28 bias which forces bellcrank's foot 31 against the valve's plunger 34, see FIG. 1. This, of course, permits pressurized supply air from the supply air line 90 to pass into the pneumatic rams 36 of the transmission assemblies 17 within a subject zone A-D, thereby causing power wheels 37 of the transmission assemblies to move upwardly into frictional driving relation with the propelling rollers 11a within that subject zone. Note that each sensing roller 19 services that zone A-D immediately upstream of that zone B-E within which it is positioned, i.e., the zone B's sensor roller 19 services zone A's transmission assemblies 17, zone C's sensor roller 19 services zone B's transmission assemblies, and so forth.

The sub-circuits 80A-80D for infeed A and intermediate B-D zones of the accumulator conveyor 10 are all identical from the pneumatic control standpoint. However, the infeed zone A is different structurally from zones B-E in that no sensing roller is provided since there is no upstream zone to control. The discharge zone's sub-circuit 80E differs from those of the infeed 80A and intermediate B-D zones in that no downstream sensing roller 19 is provided to service the discharge zone since there is no further downstream zone. Thus, there is no sensor valve 93 in the discharge zone's sub-circuit 80E so that the article propelling rollers 11a in that zone are continuously driven since that zone's rams 36 are directly connected at all times to supply air line 90 through transmission air line 91E.

In use, and as just mentioned, the article propelling rollers 11a in discharge zone E are continuously rotating since there is no further downstream zone sensing roller connected with the transmission air line 91E that services the three transmission assemblies 17 for that discharge zone E.

In use and with no articles on the conveyor 10, high pressure air is introduced into the supply air line 90, same causing fluid rams 36 to pivot all power wheels 37 upward about axis 50 into frictional driving relation with article propelling rollers 11a, and to retain same in that driving relation. This for the reason that the normally closed valves 93 are held open by the sensing rollers springs 28 when no article is present on the accumulator conveyor, thereby causing the propelling rollers to rotate continuously, i.e., to be normally live. An article 101 thereby can travel from inlet end 7 to outlet end 8 of the conveyor 10 as propelled by rollers 11a in the zones A–E.

An article 101 proceeds from the infeed zone A through the intermediate zones B–D it may ultimately be stopped in the discharge zone E by a mechanical stop device 94, i.e., swinging arm, downstream package, or the like, shown in schematic form only. The structure by which article 101 is stopped in the discharge zone E is not relevant in connection with this invention, only the fact that it is so stopped is relevant. As the article is stopped in the discharge zone E, same depresses the sensor roller 19E, thereby pivoting that sensor roller assembly's bellcrank arm 20 away from the normally closed sensor valve 33, against spring 28 bias. This permits the normally closed valve 93 to close, and this valve 93 action exhausts pressurized air in transmission air line 91D for zone D to atmosphere, thereby exhausting rams 36D and causing power wheels 37D to drop from driving relation with rollers 11a in zone D. The propelling rollers 11a in zone D stop rotating because the rams, flexible diaphragm 61D return to the home position due to its memory as illustrated in phantom lines in FIG. 3, thereby causing the power wheels housing 41D and, hence, the power wheels 37D, to pivot out of driving engagement with the propelling rollers 11a in zone D. Thus, the article propelling rollers 11a in zone D go dead. A subsequent article (not shown) traveling along the accumulator conveyor 10 will stop in the intermediate zone D without pressuring against the article 101 stopped in the discharge zone E. In like manner, the subsequent intermediate zones C, B and the infeed zone A will accumulate articles (not shown) assuming sufficient articles are being conveyed by the conveyor 10 prior to removal of the discharge zone's article 101.

Once the abutment 94 which has stopped article 101 in the discharge zone E has been removed, that article is propelled out of that zone E further downstream and off the accumulator conveyor 10 since the propelling rollers 11a within the discharge zone E are continuously running even when the article 101 is stopped within that zone. Driving of the discharge zone's article 101 out of the discharge zone permits the sensing roller 19E within that discharge zone to pop back up due to its spring 28 bias, thereby opening again the normally closed valve 93E which services the pneumatic sub-circuit 80D for the immediately adjacent upstream zone D. Once the normally closed valve 93E is reopened, high pressure air flows again into the sub-circuit 91D to actuate the rams 36D and pivot the power wheels 37D from the nondriving to the driving attitude, thereby once again rotating the propelling rollers 11a within the immediately adjacent upstream zone D so as to convey the article (not shown) stopped within that zone D into the discharge zone E. This reactivation of the intermediate D, C, B and infeed A zones in that order proceeds back upstream in succession until all zones A–D are once again activated, assuming of course that no article has been stopped in the interim in discharge zone E by stop 94. This overall function of the pneumatic control circuit is, as previously mentioned, known to the prior art. It is merely described here for the purpose of illustrating use of the transmission assembly 17 of this invention in connection with a continuously running or normally live accumulator conveyor.

CONTROL CIRCUIT FOR NORMALLY DEAD ACCUMULATOR CONVEYOR

As previously mentioned, the fluid control circuits 81a and 81b are structured so that none of the multiple zones A–E of the accumulator conveyor 10 are operational, i.e., so that none of the power wheels 37 are drivingly engaged with the propelling rollers, when there are no articles on the accumulator conveyor. Thus, all of the zones A–E of the accumulator conveyor 10 are, in effect, dead zones when no article is on the conveyor itself. It will be understood, however, that the power wheels 37 of the transmission assemblies are continuously driven, i.e., do not stop, even when the power wheels are out of driving engagement with the article propelling rollers since the endless drive chain is continuously driven by a motor (not shown). Each zone A–E is provided with a sensor roller 19. Within a subject zone A–E, the sensor roller 19 located in that same zone provides a mechanical input signal into that same zone's fluid control sub-circuit 81A–E when an article is in that same zone. Input pneumatic control signals from each forward and rearward zone are fed into a subject zone's fluid control sub-circuit except, under certain circumstances set forth below, in connection with the infeed 81A and discharge 81E zones. Output pneumatic control signals to each forward and rearward zone are also fed from a subject zone's fluid control sub-circuit except, under certain circumstances set forth below in connection with the infeed 81A and discharge 81E zones.

In operation, and generally speaking, each zone A–E is in a nonpropelling state when no articles are being conveyed, i.e., the article propelling rollers in all zones 81A–E are dead or nonrotating. A subject zone shifts to a propelling state, i.e., the transmission assemblies are activated, when the sensor roller 19 of the immediately upstream zone is actuated by an article. The subject zone remains in that propelling state as the conveyed article moves out of the immediately upstream zone and activates the subject zone's sensor roller. As the article releases the sensor roller 19 in the immediately upstream zone, that zone reverts back to the dead or nonpropelling state. When the subject zone's sensor roller 19 is actuated, the immediately adjacent downstream zone also shifts to the propelling state. As the article moves through and finally clears the sensor roller 19 for the subject zone, that zone also returns to the nonpropelling state. Thus, an article travels the entire length of the conveyor 10 with only the propelling rollers 11a of the subject zone in which it is traveling, and the next forward or immediately downstream zone therefrom, being powered or live. In connection with accumulation of articles on the conveyor, and within a subject zone where the article is stopped, that article in that subject zone causes the fluid control sub-circuit in the adjacent upstream zone to deactivate the transmission assemblies in that zone, i.e., to stop the propelling rollers 11a in that zone, when the sensor roller of that zone is depressed by the next following article. The next following article is then advanced along the conveyor until it reaches that adjacent upstream zone where it stops. All succeeding articles advance to the most forward but unoccupied zone in like manner. As the stopped article in the subject zone is released, the adjacent upstream zone is reactivated, i.e., the propelling rollers 11a in that adjacent upstream zone are once again driven or made live by power wheels 37, and the article in that zone is advanced. Successive upstream zones are in like manner reactivated in sequence, and the articles advance over the conveyor from zone to zone as previously described. This control method for accumulator conveyors provides the advantages of operation as set out above.

There are two embodiments of this fluid control circuit 81 illustrated, a first embodiment shown in FIGS. 8-17 where the discharge zone E is continuously running, i.e., live, when an article is stopped therein, and a second embodiment shown in FIGS. 18-20 where the discharge zone E goes dead, i.e., stops, when an article reaches same. In this regard, the intermediate zone sub-circuits 81B-81D of the fluid control circuit are the same for both embodiments, and the infeed zone sub-circuit 81A for both embodiments is also the same. It is only the discharge zone's sub-circuit 81E which differs amongst the two embodiments, 81a, 81b. The basic overall control circuits 81a for the first embodiment is illustrated in FIG. 8, and for the second embodiment 81b is illustrated in FIG. 18, same differing only in the sub-circuits of the discharge zones E as previously mentioned. The fluid control circuit 81 basically includes a supply air line 105 connected with a high pressure air source (not shown) high pressure air being continuously supplied to that line 105. A typical fluid control sub-circuit 81B-D for an intermediate zone B-D includes a sensor valve 106, a control valve 107, and a signal valve 108. Each zone's control valve 107 is directly connected to the supply air line 105 on one side, and on the other side is connected to the transmission air line 109 that services the three transmission assemblies within that zone. The control valve 107 is a normally closed valve that is primary pilot 110 operated to shift same from the normally closed to the open position in response to an open air signal, and that is spring 111 loaded to shift same to the normally closed position in response to a balancing close air signal on secondary pilot 112. The sensor valve 106 is connected at one side to the supply air line 105. The sensor valve's other side is connected to the in-zone control valve's primary pilot 110, and to the in-zone signal valve's pilot 114. The sensor valve's other side is also connected to the adjacent downstream zone control valve's primary pilot 110, and to one side of the adjacent upstream zone's signal valve 108. An interconnect air line 113 serves to interconnect all of the sub-circuits 81A-E to establish the in-zone sensor valve 106 downstream zone control valve's primary pilot 110 connection relationship, bidirectional check valve 115a-115d separating the various sub-circuit 81A-E portions of that interconnect air line one from the other at the joinder of control valve line 116 with the interconnect line 113. The signal valve 108 of a subject zone is connected on its one side, as previously mentioned, to the downstream zone's sensor valve 106 through a signal air line 117, and at the other side to auxiliary pilot 112 of the subject zone's control valve 107. The sensor valve 106 is a normally open valve held closed against its internal spring (not shown) bias when no article is within a subject zone. The sensor valve 106 is held in that closed attitude by the bias of the subject zone's sensing roller spring 28 as discussed above. Hence, when a subject zone's sensing roller 19, which is in-zone, is depressed by an article within the zone, the normally open but held closed sensor valve shifts to the normally open attitude. The infeed zone's sub-circuit 81A for each control circuit 81a and 81b is the same as an intermediate zone sub-circuit 81B-D with the exception that there is no interconnection between an immediately upstream zone's sensor valve and the primary pilot 110 of that infeed zone's control valve 107 for the reason there is no further upstream zone.

In that first embodiment of the fluid control circuit 81a where the discharge zone E is remaining or running or live when an article is present thereon, the discharge zone sub-circuit 81E is as illustrated in FIG. 8. The sub-circuit 81E of the discharge zone is the same as an intermediate zone's sub-circuit 81B-81D except that no signal valve 108 is present in the sub-circuit, and there is no secondary pilot 112 on the control valve 107 since there is no zone downstream of the discharge zones which must be interrelated therewith as is the case with, of course, the intermediate zones B-D and the infeed zone A. In that second embodiment of the fluid control circuit 81b where the discharge zone E is a dead zone with an article present therein, i.e., where the discharge zone does not run with an article thereon, the sub-circuit 81E is as shown in FIG. 18. The discharge zone's sub-circuit 81E is the same as an intermediate zone's sub-circuit 81B-81D with the exception that no signal valve 108 is present in the sub-circuit 81E. In this sub-circuit 81E, the sensor valve 106 is directly connected via line 131 from its other side via line 131 to the secondary pilot 112 of the control valve 107. In each circuit 81a and 81b, and in all zones A-E served by those circuits, it is important to note that each sensor roller 19 is located within that zone which it serves. This, of course, is different from the fluid control circuit 80 illustrated in FIG. 7 where each sensor roller 19 is disposed in an immediately downstream zone from that zone which it serves.

In use of that central circuit 81a embodiment where the discharge zone 81E is continuously running or live with an article stopped therein, the sequence of first accumulating and then discharging a series of articles on the conveyor 10 is illustrated in FIGS. 8-17. The dispositon of the fluid control circuit 81a, and of each of the sub-circuits 81A-81E, is as illustrated in FIG. 8 with no articles at all on the conveyor 10. In this initial attitude, high pressure air is blocked from access to the transmission assemblies because all normally closed control valves 107 are closed due to spring bias on those valves in each of the zones A-E. Further, and in each of the zones A-E, the sensor valves 106 are likewise closed because, even though same are normally opened valves, same are closed due to the spring bias of the sensor rollers 19. Thus, no high pressure air from the supply air line 105 has access to any of the transmission assemblies in any of the zones A-E and, hence, the transmission assemblies remain dropped out of driving engagement with the article propelling rollers 11a. This for the reason that each power wheel 37 drops downwardly about pivot axis 50 due to gravity forces on each power transfer device 35, as well as due to the continuous passing of drive chain 56 through the power transfer device's housing 41, when pneumatic ram 36 is not activated by high pressure air. This attitude results in all zones A-E being dead, i.e., all article propelling rollers 11a being stopped.

As a first article 120 enters the infeed zone A, and as illustrated in FIG. 9, same depresses the infeed zone's sensing roller 19 which, in turn, permits the normally open sensor valve 106 to shift to the open position. This provides high pressure air through interconnect line 113 and control valve line 116 to the primary pilot 110 on the control valve 107 within the infeed zone A, as well as through a check valve 115a and control valve line 116 to the primary 110 pilot on the control valve 107 within the immediately downstream zone B. These air signals to the primary pilots 110 of zones A and B of the infeed zone control valve 107 and the immediately downstream zone control valve 107 cause those valves to shift from the normally closed attitude into the open attitude in which high pressure air passes through from the supply air line 105 through transmission lines 109 into the pneumatic rams 36 that service each of the power transmission devices for the infeed zone A as well as the immediately downstream zone B therefrom. Such, of course, activates the power transfer devices, thereby moving the power wheels 37 into driving engagement with the article propelling rollers 11a so as to activate or make live the infeed zone A as well as the immediately downstream zone B therefrom. All other further downstream zones C–E are still dead or nonpowered as long as the article 120 remains in the infeed zone A. The infeed zone A is now powered or live, and propels the first article 120 therethrough into the intermediate zone B.

As shown in FIG. 10, and with the first article 120 now in the first intermediate zone B, the sensing roller 19 of that zone is depressed so as to permit the sensor valve 106 to open. This provides an air signal through signal air line 117 to the signal valve 108 of the infeed zone A, which signal does not have an operative function under the circumstances illustrated in FIG. 9 since normally closed signal valve 108 is closed, but which does have an operative function once the accumulator conveyor 10 is fully loaded as is described hereinafter. Further, an air signal passes through the check valve 115a into the zone B control valve's primary pilot 110 to maintain that control valve 107 from the normally spring biased closed attitude into the open attitude so as to transmit high pressure air from supply air line 105 into transmission air lines 109 for activating the pneumitic rams 36 and, thereby, driving the propelling rollers 11a. With the sensor valve 106 opened, an air signal also passes through check valve 115b into control valve line 116 of the immediately adjacent downstream zone's sub-circuit 81C so as to activate the pilot 110 of that control valve 107, thereby opening that control valve 107 so as to activate the propelling rollers (through cooperation of rams 36 and power wheels 37) in that immediately downstream zone C as well. The intermediate zone B is now powered or live and propels the first article 120 therethrough into the intermediate zone C. All other zones A, D, and E are dead or nonpowered as long as the article 120 remains in zone B. It will be noted in this FIG. 10 attitude that the infeed zone A is now, in effect, a dead zone as its normally open sensor valve 106 has been returned to the closed attitude due to the spring bias on the sensing roller 19, since no article is in that zone A to depress that sensing roller 19. This eliminates the air signal to primary pilot side 110 of that valve 107, thereby permitting the normally closed valve 107 to close through spring 111 bias. This, in turn, permits the rams 36 to drop out of driving engagement with the propelling rollers, thereby causing those rollers to stop, i.e., causing the zone A to go dead.

FIG. 11 illustrates the first article 120 within zone D, immediately upstream of discharge zone E, after having proceeded through zone C. As shown in that figure, and with the article 120 in the zone D, that zone D is a powered or live zone as an air signal from supply air line 105 to that zone's pilot 110 of control valve 107 through the sensor valve 106 and check valve 115c (the sensor valve 106 having been opened by fact of the article depressing sensor roller 19) keeps the control valve 107 open to connect transmission air line 109 and supply air line 105, thereby providing high pressure air to the fluid rams 36 for raising the power wheels 37 into driving engagement with the propelling rollers 11a. As with the earlier effect of an article in a subject zone on an immediately adjacent downstream zone, air signal passes into discharge zone control valve's pilot 110 through the check valve 115d, thereby urging zone E's normally closed control valve 107 into the open attitude to permit flow of high pressure air from supply air line 105 into transmission air line 109 for activating fluid rams 36. Such activates the propelling rollers 11a in the discharge zone E, i.e., turns that zone E into a live zone. The immediately upstream zone C from which the article 120 has arrived in the subject zone D has gone dead as that zone's sensing roller 19 popped up after the article 120 was propelled passed it, thereby permitting the normally open sensor valve 106 to be closed once again. This, of course, stops the air signal through the control valve 107, thereby permitting the spring 111 bias of same to close and exhaust the air in the transmission air line 109 to atmosphere. Such, of course, causes drive wheels 37 to drop out of driving relation with rollers since fluid rams 36 are no longer provided with a pressure air signal.

The first article 120 on the conveyor 10 is stopped in the discharge zone E by a mechanical stop 121, shown in schematic form, see FIG. 12. Such a mechanical stop 121 could be an article immobily positioned immediately downstream of that discharge zone E (because, for example, same is stopped in its travel path), or could be a mechanical control stop arm of some type, not shown. In any event, and in the discharge zone E with the first article 120 depressing the sensor roller 19, the previously closed sensor valve 106 has moved to the open attitude, thereby providing air signal back through check valve 115d to pilot 110 of the control valve 107. Such keeps open the control valve 107 against the spring 111 bias, thereby permitting high pressure air to keep the fluid rams 36 activated to maintain the power wheels 37 in a driving relationship with propelling rollers 11a. Note in this discharge zone embodiment, that as long as the first article 120 is depressing the sensing roller 19, the propelling rollers 11a are rotating, i.e., are attempting to drive the article 120 from the discharge zone E. The article 120 is prevented from being driven off the discharge zone E, as previously mentioned, by the mechanical stop 121 associated therewith. Once the article 120 has reached the discharge zone E and is stopped therein, and as was previously the case with each immediately upstream zone to a subject zone within which the article resided during its travel from the conveyor's inlet end 7 to the outlet end 8, the immediately upstream adjacent zone D has gone dead once the article 120 passed out of contact with the sensing roller 19 since that sensing roller was popped back up above the conveying plane by its spring. This caused the sensor valve 106 to be closed, thereby eliminating an air signal to control valve pilot 110 which, in turn, causes the control valve 107 to be closed by the bias of spring 111. Closure of the control valve 107, of course, eliminated high pressure air from the transmission air line 109, thereby causing the power wheels 37 to drop out of driving relation with the propelling rollers 11a. Under this situation, zone D is a dead zone.

FIG. 12 also illustrates a second article 122 proceeding within the infeed zone A. The second article 122 within the infeed zone A proceeds from the infeed zone A to intermediate zone B to intermediate zone C to intermediate zone D in the same control circuit manner as previously mentioned for the first article 120 and described in connection with FIGS. 8–11.

Once the second article 122 has achieved the intermediate zone D adjacent the discharge zone E, and as illustrated in FIG. 13, the propelling rollers 11a in that intermediate zone D are deactivated, i.e., go dead, due to the air signal provided through signal air line 117 from the discharge zone's sensor valve 106. In other words, with the second article 122 resting in the zone D immediately upstream of the discharge zone, and in addition to the air signal provided to the control valve's primary pilot 110 through control air line 116 which keeps that control valve 107, i.e., which connects transmission air line 109 and supply air line 105, an air signal is also provided to that zone D's pilot 114 to open that signal valve 108 relative to the signal air line 117 of the discharge zone E. With the signal valve 108 of zone D open, the air signal issuing from the discharge zone E's sensor valve 106 through signal air line 117 passes through the signal valve 108 and operates the secondary pilot 112 of zone D's control valve 107. The secondary pilot 112 of the control valve 107 is sized to damp out the primary pilot 110 of the control valve 107 when an air signal is received, thereby permitting the spring 111 bias of the control valve 107 to return that control valve 107 to the normally closed attitude. Once the control valve 107 of the immediately adjacent upstream zone D is closed, no further high pressure air reaches the transmission air line 109, thereby deactivating the fluid rams 36 and causing the power wheels 37 to drop out of driving engagement with the propelling rollers 11a. This, of course, causes the zone D, i.e., the zone immediately upstream of the discharge zone E, to go dead. As previously explained, the discharge zone E itself remains activated in this control circuit 81a embodiment, but the second article 122 in the immediately adjacent upstream zone D is kept from pressuring against the article 120 in the discharge zone E by virtue of the fact that the immediately adjacent upstream discharge zone D has gone dead due to the return air signal from the discharge zone E's sensor valve 106 through the upstream zone D's signal valve 108.

FIG. 13 also indicates entry of yet a third article 124 into the infeed zone A, that third article proceeding from the infeed zone into the first intermediate zone B and into the second intermediate zone C in accord with the control circuit 81a manner previously discussed with reference to FIGS. 8–11. And further, the third article 124 is stopped in the middle intermediate zone C by virtue of the same type air signal through signal air line 117 from the downstream intermediate zone D's sensor valve 106 interacting on the middle intermediate zone C's control valve 107 through signal valve 108, as was the case with the discharge zone E's sensor valve 106 interaction with intermediate zone D's control valve 107 through signal valve 108 and signal air line 117 just previously described.

The fluid control circuit 81a for a fully loaded accumulator conveyor (i.e., the accumulator conveyor with an article 120, 122, 124, 126, 128 stopped in each zone A–E) is illustrated in FIG. 14. As shown in that drawing, the infeed A and all intermediate B–D zones are dead, i.e., the pneumatic rams 36 of all zones are deactivated so that their power wheels 37 have dropped out of driving relation with the propelling rollers 11a. The discharge zone E's propelling rollers 11a remain continuously running or live as heretofore mentioned. More particularly, and with reference to each of the sub-circuits 81A–81E, the air signal provided through discharge zone E's sensor valve 106 to the intermediate zone D's control valve 107 through the signal air line 117 and zone D/s signal valve 108 to secondary pilot 112 allows the spring 111 of that control valve 107 to overcome the air signal on primary pilot 110, thereby permitting the control valve 107 to close. This, in turn, causes the power wheels 37 to drop out of driving relation with the propelling rollers even though the sensor roller 19 is still depressed, i.e., even though sensor valve 106 is still open to supply air line 105. Likewise, and with reference to the middle intermediate zone C, the air signal provided through signal air line 117 on secondary pilot 112 of that zone C's control valve 107 through zone C's signal valve 108 causes the middle intermediate zone C's control valve 107 to close due to spring 111 bias, thereby also exhausting the transmission air line 109 to atmosphere. This permits the power wheels 37 of the middle intermediate zone C to drop out of driving relation with the propelling rollers even though the sensing roller 19 in that middle intermediate zone C remains depressed due to an article resting thereon, i.e., even though sensor valve 106 is still open to supply air line 105. An identical relationship between the middle intermediate zone C and the upstream intermediate zone B, and between the upstream intermediate zone B and the infeed zone A, exists vis-a-vis that just described in connection with the discharge zone E and the downstream intermediate zone D, and that just described in connection with the downstream intermediate zone D and the middle intermediate zone C. Thus, and as previously noted, the infeed A and all intermediate zones B–D are dead, i.e., the propelling rollers 11a are not driven, when the accumulator conveyor 10 is fully loaded, i.e., when an article 120, 122, 124, 126, 128 is positioned in each zone A–E of the accumulator conveyor, even though the sensor rollers 19 are activated in each zone A–D by the article therein, and even though the propelling rollers 11a in the discharge zone are continuously driven or rotating. It will be recalled, of course, that the article 120 in the discharge zone E is refrained from discharge off that zone by a mechanical stop 121, not shown in detail.

Once the mechanical stop 121 is removed (e.g., raised up as shown) from stopping relation with the 120 article in the discharge zone E, and because the discharge zone's rollers 11a are continuously running due to the pneumatic sub-circuit 81E of that discharge zone as previously explained, the article 120 in that zone will, of course, be driven downstream out of that zone as is illustrated in FIG. 15. Once the article 120 is driven out of the discharge zone E, the sensor roller 19 pops back up into the sensing plane by the spring bias on the sensing roller's bellcrank arm forcing the normally open sensor valve 106 back into the closed attitude. This would normally (i.e., without an article 122 in upstream zone D) exhaust the air signal in transmission air line 109 to atmosphere because, of course, no high pressure air would pass into that line 109 since the control valve 107 would be closed (closure of the sensor valve 106 would stop the air signal through control valve line 116 to the control valve E's primary pilot 110, thereby causing that normally closed valve to close due to spring 111 bias). However, and importantly, the discharge zone's transmission assemblies remain drivingly engaged with the propelling rollers 11a since the primary pilot 110 of the control valve 107 continues to receive an air signal from the sensor valve 106 of the adjacent upstream zone D, which sensor valve 106 is open because of article 122 depressing sensor roller 19. Furthermore and importantly, with the air signal from discharge zone E's sensor valve 106 removed from the secondary pilot 112 on the upstream zone D's control valve 107 (because of closure of sensor valve 106 when article 120 is discharged from zone E) that control valve 107 once again opens in response to the air signal through control air line 116 from the opened sensor valve 106 is zone D. With the upstream zone D's control valve 107 now open once again, the pneumatic rams 36 of the transmission assemblies are once again exposed to high pressure air through transmission air line 109, thereby moving the power wheels 37 back into driving relation with the propelling rollers 11a. This, of course, causes the article 122 within that zone D to be driven into discharge zone E and, ultimately, off the outlet end 8 of the conveyor if stop 121 does not prevent same. Until the second article 122 leaves zone D, however, all other upstream zones A-C therefrom remain dead due to the respective air signals through respective signal air lines 117 which pass through the respective signal valves 108 to oppose the air signals on the control valves' primary pilots 110.

As shown in FIG. 16, the second article 122 from intermediate zone D has been driven to the discharge zone E whereat it is stopped by stop 121, stoppage of the article 122 in zone E resulting in that zone's rollers 11a being continuously driven as previously explained. After article 122 leaves zone D, the sensing roller 19 within that zone D pops back up into the sensing plane. Such an action by the sensor roller 19 in zone D would normally exhaust the transmission air line 109 to atmosphere (and, thereby stop drive rollers 11a) through the control valve 107, since the sensor valve 106 normally would be biased closed by the sensor roller's spring, when no article is in zone C. This, in turn, normally would cause the air signal on secondary pilot 112 of control valve 107 to be relieved since signal valve 108 closes when sensor valve 106 closes, thereby permitting the control valve 107 to close and the zone D to go dead, when no article is in zone C. However an air signal is still received on the control valve D's primary pilot 110 from zone C's sensor valve 106 through valve 115c and line 116 to keep that control valve 107 open since that zone C's sensor roller 19 is depressed by article 124. This, of course, keeps the transmission air line 109 open to high pressure air from supply air line 105 and, of course, keeps pneumatic rams 36 activated so as to keep power wheels 37 engaged drivingly with rollers 11a, i.e., keeps the rollers alive. As was the case with zone D vis-a-vis zone E, the middle intermediate zone C becomes reactivated to move the article 124 in that zone C into the downstream intermediate zone D once article 122 has passed out of zone D into zone E, i.e., once sensor roller 19 in that zone C pops back up. This zone A-D reactivation is sequentially repeated until all upstream articles 122, 124, 126, 128 are moved, in sequence, downstream to fill up the downstream zones B-E, i.e., until the FIG. 17 attitude is attained. The FIG. 17 attitude is, in effect, equivalent to the FIG. 14 attitude with the exception that no article rests in the infeed zone A. The drive rollers 11a in zone A are dead, i.e., nondriven, as shown in FIG. 17 because sensor roller 19 is spring biased to close sensor valve 106, thereby permitting control valve 107 to close due to spring 111 bias. This, of course, exhausts transmission air line 109 to atmosphere, deactivates air rams 36 and, thereby, disengages power wheels 37 from drive rollers. The drive rollers 11a will not go live again until another article (not shown) is received therein from upstream of the conveyor's inlet end 7 because sensor roller 19 is no longer depressed. The operation of the accumulator conveyor's control circuit 81a is repeated in accord with FIGS. 15-17 until all accumulated articles 120, 122, 124, 126, 128, one after another, have been conveyed to the discharge zone E and removed therefrom. Such, of course, ultimately clears all the articles off the conveyor.

The operation of the alternative embodiment 81b of the fluid control circuit, i.e., that embodiment where the discharge zone E is normally a dead zone when an article 130 is within that zone, is illsutrated in FIGS. 18-20. Operation of this embodiment, as shown in FIG. 18, proceeds with an article 130 passing from the infeed zone A through intermediate zones B-D in the same controlled manner as described in connection with FIGS. 8-12. Once the article 130 reaches the discharge zone E, and once the sensor roller 19 for that discharge zone is depressed so as to open the sensor valve 106, an air signal from the sensor valve 106 goes through dead line 131 to secondary pilot 112 of the control valve 107 in the discharge zone E. This air signal opposes the air signal from sensor valve 106 through control air line 116 to primary pilot 110 of the control valve 107, thereby causing the normally closed control valve 107 to close due to spring 111 bias. This, of course, exhausts transmission air line 109 of the sub-circuit 81E which serves the transmission assemblies 17 and this, in turn, causes the power wheels 37 to drop out of driving engagement with the propelling rollers. Thus, and as long as the sensor roller 19 is depressed, i.e., as long as the sensor valve 106 is opened in the discharge zone E's sub-circuit 81E, the propelling rollers are dead, i.e., the transmission assemblies are not in driving engagement therewith. Such, of course, causes the article 130 within the discharge zone E to stop within that zone for the simple reason that the propelling rollers are not driven. No stop (e.g., similar to stop 121 described in connection with FIGS. 8-17) is needed, therefore, with this circuit 81b embodiment.

With an article 130 stopped in the discharge zone E, a second article 132 proceeds from the conveyor's inlet end 7 through zones A-C and into zone D as previously described in connection with FIGS. 12 and 13. With the article in zone D, and also as illustrated in FIG. 19, an air signal is sent through the opened sensor valve 106 of the discharge zone E through signal air line 117 and opened signal valve 108 to secondary pilot 112 of the upstream zone D's control valve 107. With the article in zone D, the sensor roller 19 is depressed, thereby opening the sensor valve 106 to high pressure line 105 which also provides an air signal to primary pilot 110 of the control valve 107. These opposed air signals causes zone D's control valve 107 to close in response to spring 111 bias, thereby exhausting the transmission air line 109 to atmosphere and causing the power wheels 37 to drop out of engagement with the propelling rollers. This, of course, stops the article 132 in the immediately adjacent upstream zone D. Likewise, other articles 134, 136 (see FIG. 19) are stopped in adjacent upstream zones in reverse sequence C, B, and A through the fluid sub-circuits 81C, 81B and 81A as was described in connection with FIGS. 12 and 13.

The discharge zone E is reactivated, when the article 130 thereon is removed, e.g., manually or by forklift or otherwise, see FIG. 20. Once the article 130 is removed, the zone E becomes active because of an article in the immediate upstream zone D in a manner previously described in conjunction with the 81a embodiment wherein the presence of an article in a given zone activates the next adjacent downstream zone. With zone E empty, the sensor valve 106 is closed once again due to the spring bias of the sensor roller 19 as the sensor roller pops up into the sensing plane. This, of course, removes the air signal through signal air line 117 from the immediately adjacent upstream zone D's signal valve 108 since the discharge zone E's sensor valve 106 is now closed. Removal of that air signal from signal air line 117 permits the air signal in the control air line 116 to operate primary pilot 110 since the adjacent upstream zone D's sensor valve 106 has remained open because sensor roller 19 has remained depressed due to the presence of the article 132 in that immediately adjacent upstream zone D. Thus, control valve 107 in zone D opens once again to provide high pressure air through transmission air line 109 to pneumatic rams 36, thereby forcing the power wheels 37 back up into driving engagement with propelling rollers. This, of course, causes the article 132 within that zone to be driven out of that zone into the discharge zone E where same stops once again in accord with the description of FIG. 18. In other words, the articles 132, 134, 136 are moved downwardly into successive zones E, D and C, in sequence, all in accord with the control circuit operation described in conjunction with FIGS. 15–17. In this connection, it will be noted that the articles 132, 134, 136 move up a zone automatically when article 130 is removed from the discharge zone E.

Having described our invention in detail, what we desire to claim and protect by Letters Patent is:

1. An accumulator conveyor of the type having a plurality of accumulator zones between the inlet and the discharge end thereof, said conveyor comprising at least two rotatably mounted article propelling members connected to said conveyor within each zone, said members having stationary axes, each of said article propelling members being in the form of a roller rotationally mounted to said conveyor, each of said rollers being in fixed spatial relation relative one to the other, said members being selectively engaged with and disengaged from a power source for rendering all said members live or dead within a subject zone, at least one power transfer device including a friction wheel rotationally carried in a housing pivotally mounted to said conveyor for driving at least a respective one of said article propelling members within a subject zone, all said power transfer devices being movable within a subject zone about axes parallel to the axes of the respective article propelling members between a driving position in which same are drivingly engaged with said members, and a nondriving position in which same are drivingly disengaged from said members, all in response to the presence or absence of an article within that zone or a zone adjacent thereto, a flexible drive member in the form of an endless chain interconnecting all of said power transfer devices one with the other and with the power source, each power transfer device being movable independently relative to the other, and said flexible drive member continuously powering each friction wheel whether said friction wheel is engaged with or disengaged from its associated propelling roller, a drive sprocket connected to each power transfer device, said chain being operably engaged with said drive sprockets, each of said power transfer devices including a door mountable on the housing carrying the friction wheel of the power transfer device, said door holding said drive chain in operable engagement and functional relation with the associated drive sprocket when the door is in a first position, said door being movable to a second position to release the drive chain and permit disengagement of said drive chain from said drive sprocket and said housing, a respective flexible diaphragm engageable with each power transfer device, said flexible diaphragms within a subject zone being flexed to a first position at which said power transfer devices are drivingly engaged with said article propelling members in response to one of a fluid pressure produced force component greater than a predetermined magnitude acting in a first direction thereagainst and a fluid pressure produced force component less than said predetermined magnitude acting in said first direction thereagainst, and being flexed to a second position at which said power transfer devices are drivingly disengaged from said members in response to the other of a fluid pressure produced force component greater than a predetermined magnitude acting in a first direction thereagainst and a fluid pressure produced force component less than said predetermined magnitude acting in said first direction thereagainst, and sensor means operable by articles on the conveyor for controlling application of fluid pressure to the diaphragms.

2. A conveyor as set forth in claim 1, each flexible diaphragm including a central crown section adapted to move to said first position into contact with said power transfer device when fluid pressure is exposed thereto, and an annular spring section adapted to return said crown section from said first position to said second position when fluid pressure against said crown section is relieved.

3. A conveyor as set forth in claim 2, said flexible diaphragm being mounted beneath said power transfer device, thereby permitting said power transfer device to return by gravity to said nondriving position.

4. An accumulator conveyor of the type having a plurality of separate zones between the inlet end and the discharge end thereof, said conveyor comprising at least one article propelling member connected to said conveyor within each zone, said article propelling member being in the form of a roller rotationally mounted to said conveyor powering an article resting thereon within said zone thereacross from the adjacent upstream zone to the adjacent downstream zone, the rollers being in spatial relation relative one to the other, a separate power transfer device including a friction wheel rotationally carried in a housing pivotally mounted to said conveyor for each zone associated with said article propelling member, said power transfer device being selectively engageable with and disengageable from said article propelling member for selectively operating said article propelling member, a drive sprocket connected to said friction wheel, means for moving each of the power transfer devices to bring the friction wheel thereof into engagement with and into disengagement from the associated article propelling member, a flexible drive member in the form of an endless chain operably engaged with the drive sprockets interconnecting all of said power transfer devices and a power source, said flexible drive member continuously powering each power transfer device whether said power transfer device is engaged with or disengaged from its associated article propelling member, and a door mountable on the housing carrying the friction wheel of the power transfer device, said door holding said drive chain in operable engagement and functional relation with said power sprocket when the door is in a first position, said door being movable to a second position to release the drive chain and permit disengagement of said drive chain from said power sprocket and said housing.

5. A conveyor as set forth in claim 4, wherein the means for moving each power transfer device includes a flexible diaphragm including a central crown section adapted to move from a nondriving position to a driving position in contact with said power transfer device to bring the friction wheel thereof into engagement with the associated article propelling member when fluid pressure of at least predetermined magnitude is exposed to said crown section, and an annular spring section adapted to return said crown section from said driving position to a non-driving position when fluid pressure against said crown section is reduced to no more than a predetermined magnitude.

6. An improvement as set forth in claim 5, said flexible diaphragm being mounted beneath said power transfer device, thereby permitting said power transfer device to return by gravity to said nondriving position.

7. An accumulator conveyor which comprises an elongated framework, a plurality of article supporting rolls rotatably mounted on the framework, the rolls forming a plurality of separate zones between an inlet end and an outlet end of the conveyor, at least one of the rolls in each zone being an article propelling member for powering an article in the associated zone resting on the article propelling member, a power transfer device for each zone, a flexible drive member connecting the power transfer devices, each power transfer device including a housing pivotally mounted on the framework adjacent and underlying the article propelling member of the associated zone, a friction wheel rotatably mounted on the housing for rotation about an axis parallel to the axis of pivoting of the housing and movable with the housing between an active position in which the friction wheel is in driving relation with the associated article propelling member and a lowered position free of the associated article propelling member, drive sprocket means mounted on the friction wheel, a diaphragm member mounted on the framework underlying the housing spaced from the pivot thereof and engageable with the housing when extended to raise the housing to active position, and door means releasably mounted on the housing for holding the flexible drive member in operative engagement with the drive sprocket means, the door means being movable between an operative position in which the door means holds the drive member in operative engagement with a lower portion of the drive sprocket means and a released position in which the flexible drive member can be disengaged from the drive sprocket means and said housing, means for driving the flexible drive member to drive the friction wheels of the zones in unison, sensor means operable by articles on the conveyor, and means actuated by the sensor means for positioning the diaphragm member.

8. An accumulator conveyor as in claim 7 in which there are two article propelling members in each zone and the friction wheel of the power transfer device of each zone is in driving relation with both article propelling members of the associated zone when in active position.

9. An accumulator conveyor as in claim 7 which includes means mounted on the framework for supporting the housing when the diaphragm member is in a retracted position.

* * * * *